(12) United States Patent
Weissman (10) Patent No.: US 6,819,936 B2
(45) Date of Patent: Nov. 16, 2004

(54) AUTOMATIC GAIN SETTING IN A CELLULAR COMMUNICATIONS SYSTEM

(75) Inventor: Haim Weissman, Haifa (IL)

(73) Assignee: Qualcomm Incorporation, San Diego, CA (US)

( * ) Notice: Subject to any disclaimer, the term of this patent is extended or adjusted under 35 U.S.C. 154(b) by 517 days.

(21) Appl. No.: 09/954,591

(22) Filed: Sep. 14, 2001

(65) Prior Publication Data

US 2002/0061763 A1 May 23, 2002

Related U.S. Application Data

(60) Provisional application No. 60/252,612, filed on Nov. 21, 2000, and provisional application No. 60/282,660, filed on Apr. 9, 2001.

(51) Int. Cl.[7] ................................................. H04Q 7/20
(52) U.S. Cl. .......................... 455/522; 455/69; 455/561
(58) Field of Search ............................. 455/522, 69, 14, 455/561, 562.1, 20, 22, 24

(56) References Cited

U.S. PATENT DOCUMENTS 5,115,514 A    5/1992   Leslie ............................ 455/9

FOREIGN PATENT DOCUMENTS

| EP | 0851606 | 12/1997 | ........... H04B/7/155 |
| EP | 1022849 | 7/2000 | ........... H03G/3/20 |
| WO | 9927720 | 6/1999 | ........... H04Q/7/20 |

Primary Examiner—Melur Ramakrishnaiah
(74) Attorney, Agent, or Firm—Philip Wadsworth; Charles D. Brown; Donald Kordich (57) ABSTRACT

A method for adjusting a power level in a communications network which includes a first plurality of signal-transmission-elements adapted to receive signals coupled to a second plurality of signal-transmission-elements adapted to transmit the signals, the method including de-activating at least some of the first plurality so that the signals are not received in the first plurality and de-activating at least some of the second plurality so that the signals are not transmitted from the second plurality. The method includes injecting a reference signal having a predetermined injected power level at the first plurality, receiving the reference signal at the second plurality, measuring a received power level of the reference signal at the second plurality, comparing the injected and received power levels, and, responsive to the comparison, setting a gain of at least one of the signal-transmission-elements comprised in the first and second pluralities.

24 Claims, 5 Drawing Sheets

AUTOMATIC GAIN SETTING IN A CELLULAR COMMUNICATIONS SYSTEM

RELATED APPLICATIONS

This application claims priority to U.S. Provisional Application No. 60/252,612, filed Nov. 21, 2000, and U.S. Provisional Application No. 60/282,660, filed on Apr. 9, 2001.

FIELD OF THE INVENTION

The present invention relates generally to gain control in communications systems, and specifically to gain control of repeaters within communications systems.

BACKGROUND OF THE INVENTION

A cellular communications network which operates in regions closed off from electromagnetic radiation, such as within buildings or inside tunnels, typically achieves coverage within the closed-off regions by using a repeater system. The repeater system comprises a first repeater outside the region communicating directly with a base-station transceiver system (BTS), a second repeater inside the region communicating directly with mobile units within the closed-off region, and cabling connecting the two repeaters. It is known in the art that varying signal levels at the BTS or at the mobile units adversely affect operation of the network, by effectively increasing the noise in the network, thus decreasing signal/noise levels. The effect is overcome by constantly monitoring signal levels at the BTS and at the mobile units, and most preferably adjusting gains of the mobile units to maintain the signal levels as constant as possible. With the interposition of a repeater system between the BTS and the mobile units, it is important that signal level changes caused by changes of gain within the repeater system are minimized, and that they are made slowly, to ensure that the repeater system remains substantially transparent to the network.

U.S. Pat. No. 5,799,005 to Soliman, whose disclosure is incorporated herein by reference, describes a system and method for estimating the quality and path loss associated with a communications channel. The estimate is made by measuring the power of a pilot signal received by a communications receiver. The communications receiver measures a received signal power, and also makes a relative pilot strength measurement of the received pilot signal. The power of the pilot signal is then computed using the received signal power and the relative pilot strength measurement. A base station also transmits an indication of the power at which the pilot signal was transmitted. An estimate of the path loss is then made by determining the difference between the indicated power of the transmitted pilot signal and the received pilot signal power.

U.S. Pat. No. 5,991,284 to Willenegger, et al., whose disclosure is incorporated herein by reference, describes a method for controlling the transmitted power of each sub-channel generated by a station transmitting a channel. The station generates a channel made up of a sum of subchannels so that each subchannel or group of subchannels is amplified with a unique gain value that is varied in accordance with subchannel power control messages from a receiving station. The receiving station generates each subchannel power control message after monitoring and calculating metrics based on that received subchannel.

SUMMARY OF THE INVENTION

It is an object of some aspects of the present invention to provide a method and apparatus for controlling a gain between repeaters in a cellular communications network.

It is a further object of some aspects of the present invention to provide a method and apparatus for setting gains in an automatic calibration process for a cellular communications network.

In preferred embodiments of the present invention, a base-station transceiver system (BTS) communicates with a master repeater unit within a cellular communications network. The master unit communicates via cables with remote units, which remote units in turn communicate with mobile transceivers which are cut-off from direct communication with the BTS, inside a building, for example. The communication comprises a forward transmission path from the master unit to the remote units, and a reverse transmission path from the remote units to the master unit. The communication between the master unit and remote units enables the mobile transceivers to function within the network.

During an initialization phase, a forward gain and a reverse gain of each of the remote units are set separately, preferably in a substantially automatic manner. The forward gains are set so as to generate default power outputs, preferably substantially equal, at each remote unit. Alternatively, the power outputs of each remote unit are set according to settings transmitted thereto from the master unit. The reverse gain of each remote unit is adjusted in response to forward parameters, such as cable insertion loss, measured during the installation phase, and known differences of these parameters for the reverse transmission path.

In order to set the forward gain, a pilot reference frequency is injected after an input stage of the master unit, most preferably at a level substantially equal to the level generated by the input stage when the latter is operational. The input stage is de-activated during the initialization phase, so that only the pilot signal is transmitted in the system during initialization. The pilot reference signal is most preferably a narrow-band signal at a frequency within a band used for communication within the network. The pilot signal is detected by a respective first detector comprised in each remote unit. Using the known input level and the level read by the first detector a forward gain of the remote unit is then set so as to generate the required power output for the specific unit. Also, a cable forward insertion loss between the master and specific remote unit is calculated from the two levels.

Reverse gain levels for each remote unit are evaluated by extrapolating the forward insertion loss measurements found during the initialization phase, to find a reverse insertion loss. The extrapolation takes account of differences between the forward and reverse paths. The differences comprise cable loss differences caused by differences in transmission frequencies between the forward and reverse paths, as well as different insertion losses of elements in the two paths. Most preferably, the reverse gain set for each remote unit is generally greater than the cable reverse insertion loss by a predetermined value, such as 5 dB.

Each remote unit comprises an output stage which is de-activated during a period when the specific remote unit is being initialized. The first detector of the remote unit is positioned before the output stage. The de-activated master unit input stage and remote unit output stages act as isolators. Thus, forward and reverse gain adjustments may be implemented for each remote unit without the pilot signal generating any external interference, and without external signals causing interference with the adjustments.

In an operational phase the pilot is de-activated, and the master unit input stage and the output stage of each remote unit are activated. A forward gain of the master unit input stage is set to generate a substantially fixed nominal output level. (Most preferably, the level at which the pilot is injected in the initialization phase substantially equals this output level.) Most preferably, a master unit reverse gain is set so that a system reverse gain is substantially equal to a system forward gain. Alternatively, the reverse gain is set to be different from the forward gain by a predetermined value.

Each remote unit comprises a second detector which is used to monitor power output from the output stage of the respective remote unit. Forward and reverse gains of the master unit and each of the remote units are maintained as constant as possible in order to maintain system gain settings substantially unchanged from their installation settings, which in turn maintains signal/noise ratios in the forward and reverse transmission paths. During operation of the system, forward and reverse gains and power outputs of each of the remote units are monitored and adjusted when necessary, for example when system parameters change, so as to maintain the forward and reverse gains substantially unchanged, according to the site design. The input master unit stage and/or one or more of the remote unit output stages may be temporarily de-activated during the operational phase in order to perform measurements, such as updating of power loss values, normally implemented during the installation phase.

Incorporating stages in the master and remote units which can be de-activated so as to act as isolators, and which can be activated to operate within the units, leads to a highly flexible system for maintaining gains of the units at optimal levels, with substantially no incoming or outgoing interference.

There is therefore provided, according to a preferred embodiment of the present invention, a method for adjusting a radio-frequency (RF) power level in a cellular communications network, the network including a first plurality of signal-transmission-elements adapted to receive communication signals as a first variable-gain repeater coupled to a second plurality of signal-transmission-elements adapted to transmit the communication signals as a second variable-gain repeater, the method including:

de-activating at least some of the first plurality of signal-transmission-elements so that the communication signals are not received in the first plurality;

de-activating at least some of the second plurality of signal-transmission-elements so that the communication signals are not transmitted from the second plurality;

injecting a reference signal having a predetermined injected power level at the first plurality of signal-transmission-elements;

receiving the reference signal at the second plurality of signal-transmission-elements;

measuring a received power level of the reference signal at the second plurality of signal-transmission-elements;

comparing the injected and received power levels; and responsive to the comparison, setting a gain of at least one of the signal-transmission-elements included in the first and second pluralities.

Preferably, the method includes:

activating the at least some of the first plurality of signal-transmission-elements;

receiving at the first plurality of signal-transmission-elements the communication signals from a first region;

activating the at least some of the second plurality of signal-transmission-elements; and transmitting the communication signals to a second region from the second plurality of signal-transmission-elements.

Preferably, the first region and the second region do not overlap.

Preferably, injecting the reference signal includes measuring the predetermined injected power level with a first detector, measuring the received power level includes measuring the received power level with a second detector, and activating the at least some of the second plurality of signal-transmission-elements includes activating a power amplifier and setting a power level output of the power amplifier responsive to a power-amplifier output measured by a third detector and the predetermined injected power level measured by the first detector and the received power level measured by the second detector.

Further preferably, the method includes setting an alarm responsive to the power-amplifier level and the received power level.

Preferably, the method includes:

receiving the communication signals at a frequency outside a predetermined forward-intermediate-frequency (FWD-IF) band at the first plurality of signal-transmission-elements;

mixing the communication signals with a local oscillator (LO) signal so as to generate a forward IF signal within the FWD-IF band;

conveying the forward IF signal to the second plurality of signal-transmission-elements; and mixing the forward IF signal with the LO signal so as to recover information in the communication signals at the second plurality of signal-transmission-elements.

Further preferably, injecting the reference signal includes generating the reference signal at a reference frequency within the FWD-IF band.

Preferably, the method includes:

receiving the communication signals at a frequency outside a predetermined reverse-intermediate-frequency (REV-IF) band, different from the FWD-IF band, at the second plurality of signal-transmission-elements;

mixing the communication signals with the LO signal so as to generate a reverse IF signal within the REV-IF band;

conveying the reverse IF signal to the first plurality of signal-transmission-elements; and mixing the reverse IF signal with the LO signal so as to recover information in the communication signals at the first plurality of signal-transmission-elements;

and setting the gain of the one of the first plurality of signal-transmission-elements and the gain of the one of the second plurality of signal-transmission-elements includes:

determining gain values at the reference frequency; and extrapolating the gain values to the REV-IF band responsive to parameters of the first and second pluralities of signal-transmission-elements and of a cable coupling the pluralities.

Preferably, the first plurality of signal-transmission-elements and the second plurality of signal-transmission-elements are coupled by a cable, and the method includes determining an effective length and an effective loss of the cable responsive to the comparison.

Further preferably, the effective loss of the cable includes a forward effective loss responsive to a forward-intermediate-frequency and a reverse effective loss responsive to a reverse-intermediate-frequency different from the forward-intermediate-frequency.

Preferably, the method includes:
broadcasting an expected-output-level value from the first plurality of signal-transmission-elements;
receiving the expected-output-level value at the second plurality of signal transmission-elements; and
setting the gain of the at least one of the signal-transmission-elements included in the second plurality responsive to the expected-output-level value.

Preferably, setting the gain includes setting a forward-gain for the communication signals in a forward path included in the first and second pluralities, and setting a reverse-gain for the communication signals in a reverse path included in the first and second pluralities.

Preferably, the forward-gain and the reverse-gain differ by a pre-determined value.

Preferably, the first plurality of signal-transmission-elements receive the communication signals at a signal-reception-level, and injecting the reference signal includes injecting the reference signal at an injection-level substantially the same as the signal-reception-level.

There is further provided, according to a preferred embodiment of the present invention, apparatus for adjusting a radio-frequency (RF) power level in a cellular communications network, including:
a first plurality of signal-transmission-elements coupled as a first variable-gain repeater;
a second plurality of signal-transmission-elements coupled as a second variable-gain repeater;
a coupling connecting the first and second pluralities of signal-transmission-elements, which is adapted to convey communication signals therebetween;
a reference oscillator, which is adapted to inject a reference signal having a predetermined injected power level at the first plurality of signal-transmission-elements;
a receiver, which is adapted to measure a received power level of the reference signal at the second plurality of signal-transmission-elements;
switching circuitry, which is adapted to de-activate at least some of the first and second pluralities of signal-transmission-elements so that the reference signal is not radiated from the coupling and the first and second pluralities of signal-transmission-elements; and
control circuitry which is adapted, responsive to the injected power level and the received power level, to set a gain of one of the signal-transmission-elements included in the first and second pluralities.

Preferably, the switching circuitry is adapted to activate the at least some of the first plurality of signal-transmission-elements and the at least some of the second plurality of signal-transmission-elements so that the first plurality of signal-transmission-elements receives the communication signals from a first region and the second plurality of signal-transmission-elements transmits the communication signals to a second region.

Preferably, the first region and the second region do not overlap.

Preferably, the second plurality of signal-transmission-elements includes a power amplifier, and the apparatus includes:
a first detector which is adapted to measure the predetermined injected power level;
a second detector which is adapted to measure the received power level; and
a third detector which is adapted to measure a power-amplifier-level output of the power amplifier, so that a power-amplifier level is set responsive to the power-amplifier-level output and the predetermined injected power level and the received power level.

Preferably, the apparatus includes an alarm which is activated responsive to the power-amplifier level and the received power level.

Preferably, the first plurality of signal-transmission-elements are adapted to receive the communication signals at a frequency outside a predetermined forward-intermediate-frequency (FWD-IF) band and to mix the communication signals with a local oscillator (LO) signal so as to generate a forward IF signal within the FWD-IF band; and
the second plurality of signal-transmission-elements are adapted to receive the forward IF signal and to mix the forward IF signal with the LO signal so as to recover information in the communication signals.

Further preferably, the reference oscillator is adapted to generate the reference signal at a reference frequency within the FWD-IF band.

Preferably, the second plurality of signal-transmission-elements is adapted to receive the communication signals at a frequency outside a predetermined reverse-intermediate-frequency (REV-IF) band, different from the FWD-IF band, and to mix the communication signals with the LO signal so as to generate a reverse IF signal within the REV-IF band;
the first plurality of signal-transmission-elements is adapted to mix the reverse IF signal with the LO signal so as to recover information in the communication signals; and
the control circuitry is adapted to determine gain values at the reference frequency and to extrapolate the gain values to the REV-IF band responsive to parameters of the first and second pluralities of signal-transmission-elements and of a cable coupling the pluralities.

Preferably, the coupling includes a cable, and the control circuitry is adapted to determine an effective length and an effective loss of the cable responsive to the injected power level and the received power level.

Further preferably, the effective loss of the cable includes a forward effective loss responsive to a forward-intermediate-frequency and a reverse effective loss responsive to a reverse-intermediate-frequency different from the forward-intermediate-frequency.

Preferably, the first plurality of signal-transmission-elements are adapted to broadcast an expected-output-level value therefrom;
the second plurality of signal-transmission-elements are adapted to receive the expected-output-level value; and
the control circuitry is adapted to set the gain of the at least one of the signal-transmission-elements comprised in the second plurality responsive to the expected-output-level value.

Preferably, the first and second pluralities include:
forward-path-elements for the communication signals following a forward path from the first to the second plurality; and
reverse-path-elements for the communication signals following a reverse path from the second to the first plurality;
and the control circuitry is adapted to set a forward-gain for the forward-path-elements and a reverse-gain for the reverse-path-elements.

Preferably, the forward-gain and the reverse-gain differ by a pre-determined value.

Preferably, the first plurality of signal-transmission-elements receive the communication signals at a signal-reception-level, and the reference oscillator is adapted to inject the reference signal at an injection-level substantially the same as the signal-reception-level.

The present invention will be more fully understood from the following detailed description of the preferred embodiments thereof, taken together with the drawings, in which:

DETAILED DESCRIPTION OF PREFERRED EMBODIMENTS

Figure 1:
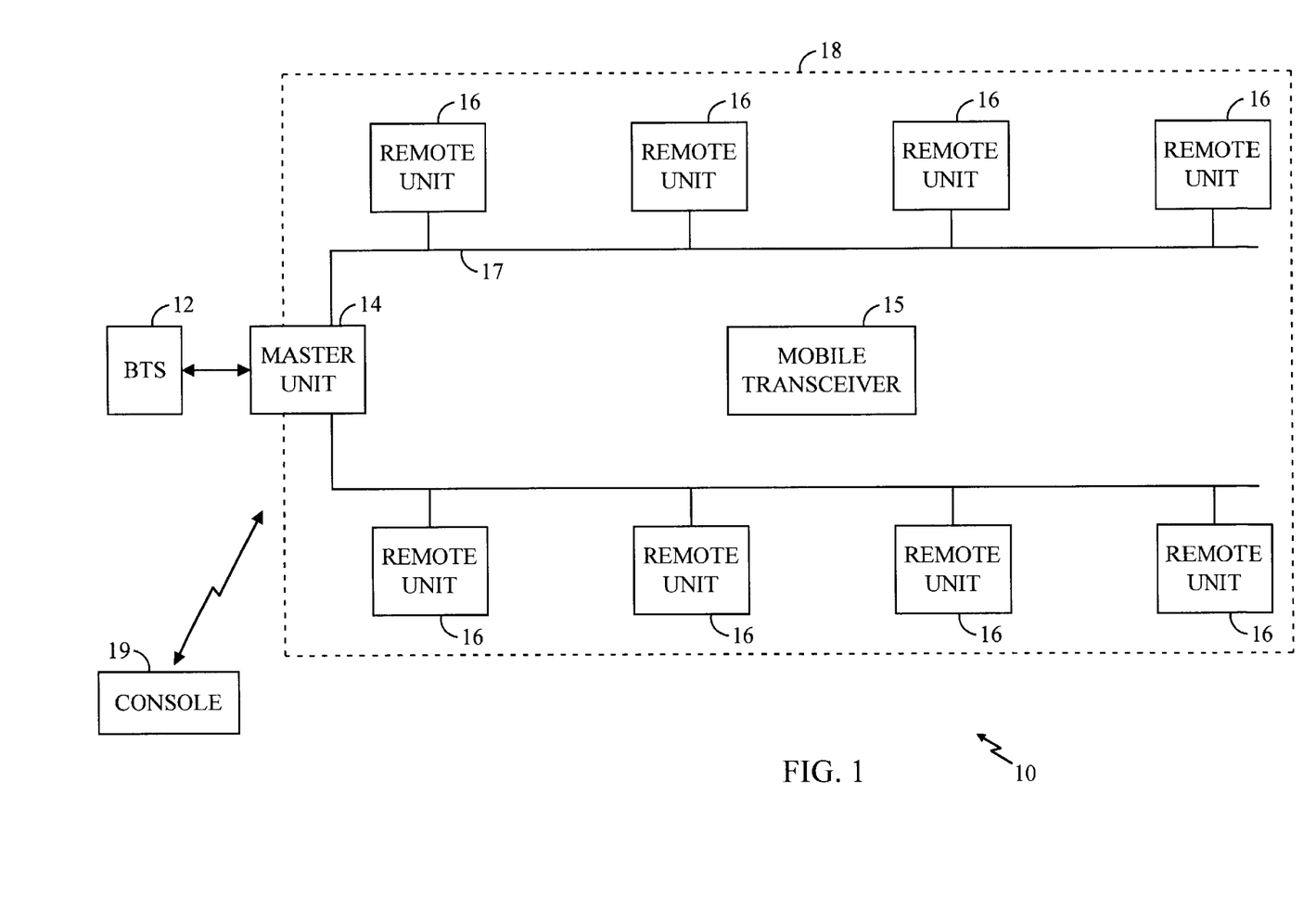
FIG. 1 is a schematic block diagram illustrating a cellular communications network, according to a preferred embodiment of the present invention.

Reference is now made to FIG. 1, which is a schematic block diagram illustrating a cellular communications network 10, according to a preferred embodiment of the present invention. In network 10 an interior of a building 18 is substantially closed off to radio-frequency (RF) electromagnetic radiation from a base-station transceiver system (BTS) 12 exterior to, or co-located within, the building. A master unit 14, most preferably located within building 18, is able to receive and transmit signals from BTS 12. Alternatively, master unit 14 is partially or wholly located outside building 18. Preferably, the RF signal emitted by BTS 12 is a code division multiple access (CDMA) signal operating at an industry-standard chip rate and in an industry-standard frequency band, although the principles of the present invention are also applicable to other coding and transmission schemes.

Master unit 14 acts as a first variable-gain repeater of signals received from BTS 12 and transfers information in the signals received to a plurality of substantially similar remote units 16 located within building 18. Remote units 16 act as second variable-gain repeaters and radiate signals incorporating the information received from master station 14 within the building. The signals radiated from remote units 16 are in a form receivable by a mobile transceiver 15 located within building 18, which transceiver is adapted to receive signals emitted by BTS 12. Most preferably, master unit 14 and remote units 16 are coupled by one or more cables 17, such as coaxial cables, which are able to transfer signals between the master station and the remote units. Remote units 16 are preferably coupled in a star configuration to master unit 14. Alternatively, master unit 14 and remote units 16 are coupled in a daisy-chain configuration, or in a combination of star and daisy-chain configurations, or in another configuration known in the art. Most preferably, at least some remote units 16 act as main remote units, receiving signals which are utilized as main signals, and at least some remote units act as diversity remote units, receiving signals utilized as diversity signals.

Network 10 further comprises an operator console 19 which enables an operator of the network to control and monitor operations of the network, by sending control signals to elements of the network via master unit 14. Console 19 is also implemented to monitor operations of the network by receiving monitoring signals from elements of the network via master unit 14. Master unit 14 preferably comprises a central processing unit (CPU) 11 and a modem 13, described in more detail below with reference to FIG. 2, which inter alia encode and decode the monitoring and control signals. Master unit 14 is most preferably also implemented so as to enable network 10 to be installed in an automatic or semi-automatic manner, as described in more detail hereinbelow. The control and monitoring signals are conveyed between console 19 and master unit 14 by methods known in the art, such as by a cable coupling and/or via electromagnetic transmissions.

Mobile transceiver 15 is also adapted to radiate signals which are receivable by BTS 12. Signals radiated by the transceiver are received by the one or more remote units 16, and information in the signals is transferred, as described in more detail below, to master unit 14. Master unit 14 radiates signals comprising the information received from mobile transceiver 15 to BTS 12.

In preferred embodiments of the present invention, forward RF signals from BTS 12 are transferred from master unit 14 to remote units 16 by first down-converting received signals to forward intermediate frequency (IF) signals in the master unit. The forward IF signals are then transferred on cables 17 to remote units 16, wherein they are up-converted to RF signals and radiated into building 18. Similarly, reverse RF signals from mobile transceiver 15 are down-converted to reverse IF signals in the one or more remote units 16, transferred by cables 17 to master unit 14, then up-converted to RF signals which are radiated for reception by BTS 12. Methods for down-conversion and up-conversion of a transmitted RF signal as described hereinabove are known in the art. A detailed description of one such method is given in a U.S. Pat. No. 6,501,942, which issued on Dec. 31, 2002 and is entitled "In-Building Radio Frequency Coverage," which is assigned to the assignee of the present application and whose disclosure is incorporated herein by reference.

Figure 2:
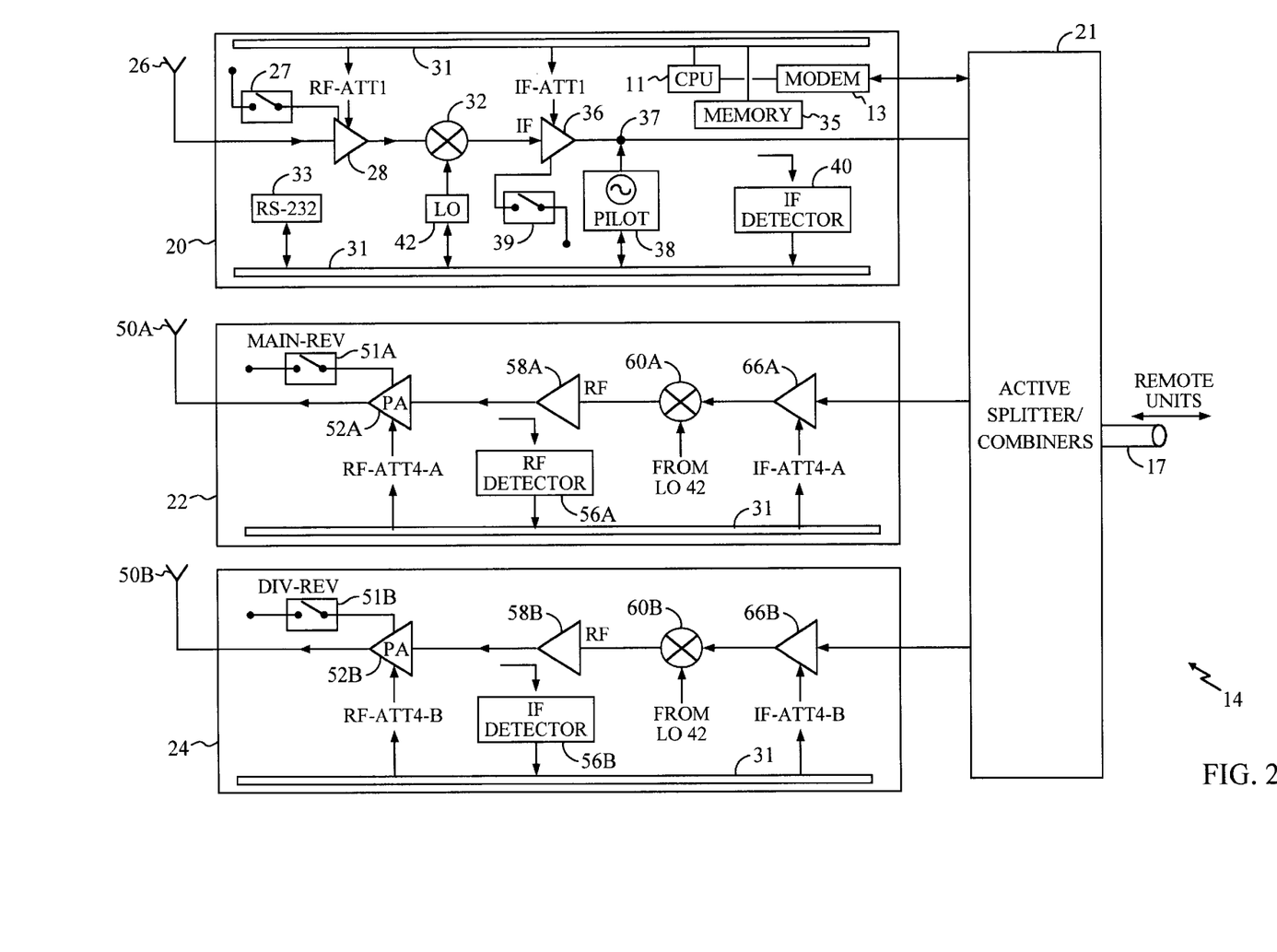
FIG. 2 is a schematic block diagram of a master unit in the network of FIG. 1, according to a preferred embodiment of the present invention.

FIG. 2 is a schematic block diagram of master unit 14, according to a preferred embodiment of the present invention. Master unit 14 comprises a forward unit 20, which conveys signals from BTS 12 to remote units 16. Unit 14 also comprises a main-reverse unit 22 and a diversity-reverse unit 24, which both convey reverse signals from remote units 16 to BTS 12. Main-reverse unit 22 transmits reverse signals from remote units 16 acting as main transmitters; diversity-reverse unit 24 transmits reverse signals from remote units 16 acting as diversity transmitters. Elements within forward unit 20, main-reverse unit 22 and diversity-reverse unit 24 are controlled by a central processing unit (CPU) 11 which is coupled to the elements via a control and monitoring bus 31.

In forward unit 20 a forward RF signal from BTS 12 is received by an RF antenna 26. The signal is input to a low noise amplifier 28 which has a gain controlled by an RF attenuator signal RF-ATT1 and which outputs an amplified signal to a mixer 32. Mixer 32 receives a local oscillator (LO) reference signal from a local oscillator 42, and down-converts its input RF signal to an intermediate frequency (IF) signal. An LO frequency is chosen so as to generate the IF frequency within an IF band that cables 17 can transfer. The IF signal is input to an IF amplifier 36, which has a gain controlled by an IF attenuator signal IF-ATT1. A power level of the output IF signal from amplifier 36 is measured by an IF level detector 40. The IF signal is transferred via active splitter/combiners 21, as are known in the art, to remote units 16 by cables 17. A pilot reference signal, generated by a pilot oscillator 38, is injected at the output of amplifier 36, so that the reference signal is also transferred to remote units 16. The pilot signal most preferably comprises a narrow-band signal having a frequency within the IF band. Alternatively, the frequency of the pilot signal is set at a frequency that cables 17 can transfer outside the IF band.

Elements of forward unit 20 such as local oscillator 42, IF level detector 40, and pilot oscillator 38 are most preferably coupled to bus 31 of the unit. Bus 31 also conveys attenuation-setting signals RF-ATT1 and IF-ATT1. Thus, operational input parameters such as the gain and/or frequency of the respective elements of the forward unit may be set via the bus. Most preferably, operational input parameters of elements of forward unit 20 are set via signals to the bus from console 19, by methods known in the art such as via an RS-232 interface 33. The signals are decoded by CPU 11 and a modem 13. Alternatively, operational input parameters of elements of unit 20 are set by other means known in the art. Similarly, values of output parameters of elements of forward unit 20, such as an IF level measured by detector 40, are most preferably placed on the bus, and are made available to console 19 by a method known in the art, such as via an RS-232 interface 33 and/or CPU 11 and modem 13. In some preferred embodiments of the present invention, values of parameters are stored in a memory 35 comprised in unit 14, for later transmission to console 19. Alternatively, values of output parameters of elements of unit 20 are made available to console 19 by another method known in the art.

Figure 3:
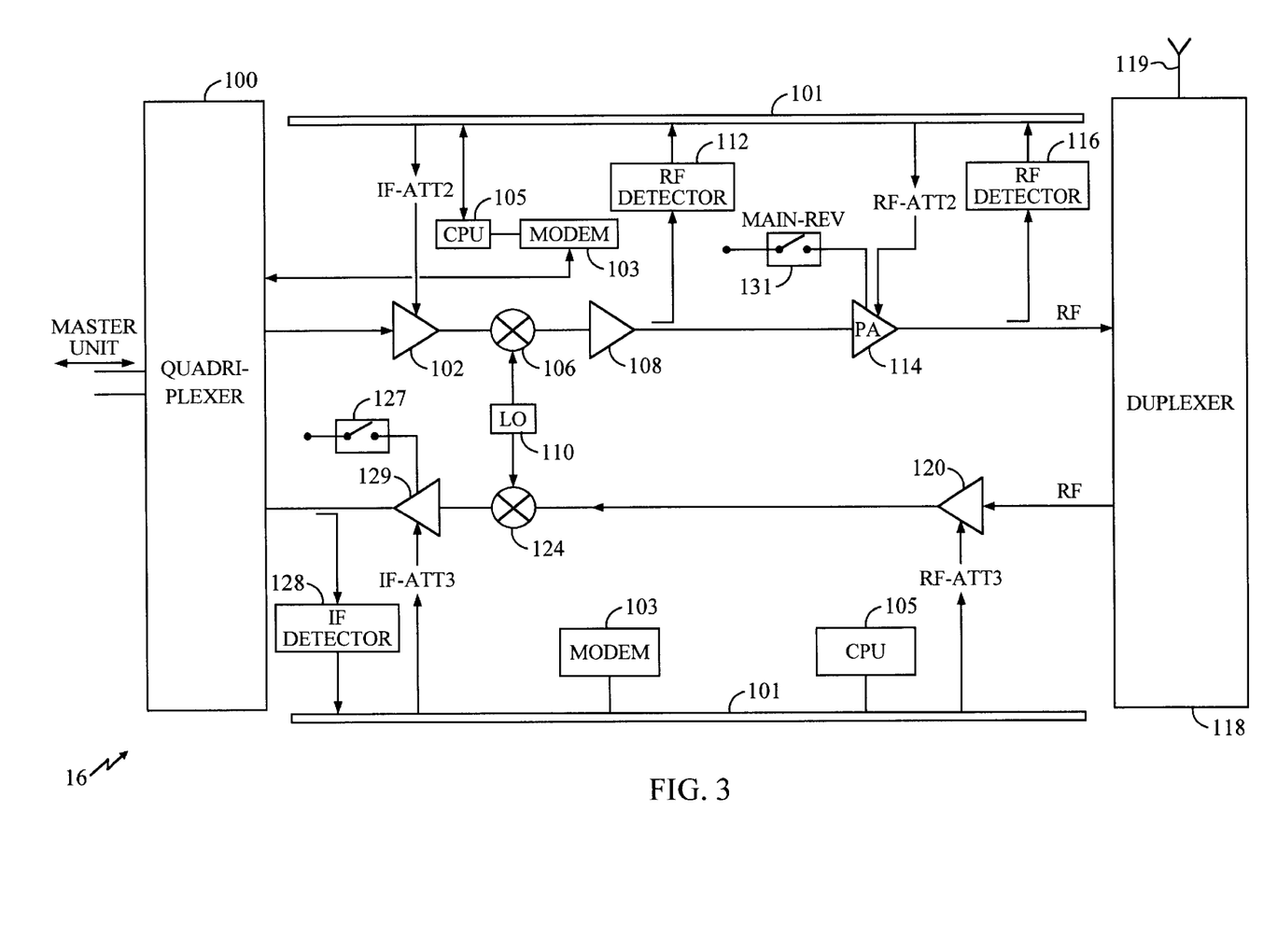
FIG. 3 is a schematic block diagram of a remote unit in the network of FIG. 1, according to a preferred embodiment of the present invention.

FIG. 3 is a schematic block diagram of one of remote units 16, according to a preferred embodiment of the present invention. Most preferably, at least some remote units are implemented to act as main-remote transceivers, and at least some remote units are implemented to act as diversity-remote transceivers. The description hereinbelow applies to a remote unit which is implemented as either a main or a diversity transceiver. Unit 16 comprises a quadriplexer 100, which is coupled to cables 17, and which inter alia transmits forward IF signals received from the cables to a forward IF pre-amplification stage 102. The attenuation of stage 102 is controlled by an IF attenuator signal IF-ATT2. Stage 102 amplifies the IF signal and outputs the ,amplified signal to a mixer 106. Mixer 106 also receives a local oscillator signal from a local oscillator 110, preferably at substantially the same LO frequency as generated by LO 42 in master unit 14. Mixer 106 up-converts the IF signal to generate a recovered forward RF signal, and inputs the recovered signal to a forward RF-amplification stage 108. An output level of stage 108 is measured by a first RF detector 112, and the recovered RF output is transferred to an RF power amplifier 114. Amplifier 114 is activated and de-activated by a switch 131. A gain of amplifier 114 is controlled by an RF attenuator signal RF-ATT2, and an output level of the amplified signal is measured by a second RF detector 116. The amplified RF signal is output via a duplexer 118 to an antenna 119, which radiates the signal to transceiver 15.

Remote unit 16 also receives at antenna 119 reverse RF signals transmitted by mobile transceiver 15. The reverse RF signals are transferred to a reverse RF pre-amplification stage 120, which has its gain controlled by an RF attenuator signal RF-ATT3. The amplified RF signal is transferred to a mixer 124 which also receives an LO signal from LO 110, and which down-converts the RF signal to a reverse IF signal. The IF signal is amplified in an IF amplifier 129, which is activated and de-activated by a switch 127. A gain of the amplifier is set by an IF attenuator signal IF-ATT3, and an output level of the reverse IF signal is measured by an IF detector 128. The reverse IF signal is transferred via quadriplexer 100 to cables 17.

Elements of remote unit 16 such as switch 131 and local oscillator 110 are most preferably coupled to a bus 101 of the unit. Bus 101 also conveys attenuation-setting signals RF-ATT2, IF-ATT2, RF-ATT3, and IF-ATT3. Thus, operational input parameters such as the gain, state, or frequency of the respective elements of the remote unit may be set via the bus. Most preferably, operational input parameters of elements of remote unit 16 are set via signals to the bus from master unit 14. Such signals are preferably keying signals transmitted from the master unit via cables 17, which signals are decoded by a modem 103 and a central processing unit (CPU) 105 so that the decoded signals are able to set the respective parameters, by one or more methods known in the art. Alternatively, operational input parameters of elements of unit 16 are set by other means known in the art. Similarly, values of output parameters of elements of remote unit 16, such as an IF level measured by IF detector 128, are most preferably placed on the bus, and are available to master unit 14 by a method known in the art, such as encoding the values in modem 103 and transmitting the encoded values to the master unit. Alternatively, values of output parameters of elements of unit 16 are made available to master unit 14 one or more other methods known in the art. It will be understood that console 19 may access output parameter values received by master unit 14, for example, in order to operate and control any element of the system.

Returning to FIG. 2, main-reverse unit 22 receives reverse IF signals, herein termed main-rev-IF signals, from remote units 16 which are implemented as main remote units. Diversity-reverse unit 24 receives reverse IF signals, herein termed diversity-rev-IF signals, from remote units implemented as diversity remote units. The signals are received via cables 17 and active splitter/combiners 21. The description below is directed to unit 22. Apart from the differences described below, the operation of unit 22 is generally similar to that of unit 24, so that elements indicated by the same reference numerals, with respective suffixes A and B in units 22 and 24, are generally identical in construction and in operation, and signals in units 22 and 24 with the same prefix have generally similar effects.

Cables 17 supply reverse IF signals to an IF amplifier 66A, a gain of which can be set by an IF attenuation signal IF-ATT4-A. An amplified IF signal is input to a mixer 60A, which also receives a local oscillator signal from LO 42. Mixer 60A up-converts the IF signal to generate a recovered reverse RF signal, which is amplified in an RF amplifier 58A. A level of the amplified signal is measured by an RF detector 56A. The amplified signal is further amplified in an RF power amplifier 52A. Amplifier 52A is activated and de-activated by a switch 5 IA, and has its gain set by an RF attenuation signal RF-ATT4-A. The output of amplifier 52A is preferably transferred via an antenna 50A to BTS 12, and the output of amplifier 52B is preferably transferred via an antenna 50B to BTS 12. Most preferably, antenna 50B is transmits polarized signals orthogonal to those transmitted by antenna 50A. Alternatively, the outputs of amplifiers 52A and 52B are transferred to BTS 12 by other means known in the art, such as by cable and/or via a multiplexer and an antenna such as antenna 26.

Elements of main reverse unit 22 and diversity reverse unit 24, such as switches 51A and 51B and detectors 56A and 56B, are most preferably coupled to bus 31. Bus 31 also conveys attenuation-setting signals IF-ATT4-A, IF-ATT4-B, RF-ATT4-A, and RF-ATT4-B. Operational input parameters of the elements of units 22 and 24 are most preferably set as described above for unit 20. Values of output parameters of elements of units 22 and 24, such as RF levels measured by detectors 56A and 56B, are most preferably made available to console 19 and/or CPU 11 as described above for unit 20.

In system 10 there are effectively two paths for signal transmission. A forward transmission path comprises elements of forward unit 20, cables 17, and elements of remote units 16 which transmit forward signals, such as amplifier 102, mixer 106, and amplifiers 108 and 114. A reverse transmission path comprises elements of remote units 16 which transmit reverse signals, such as amplifier 120, mixer 124, and amplifier 129, cables 17, and elements of reverse units 22 or 24.

Figure 4:
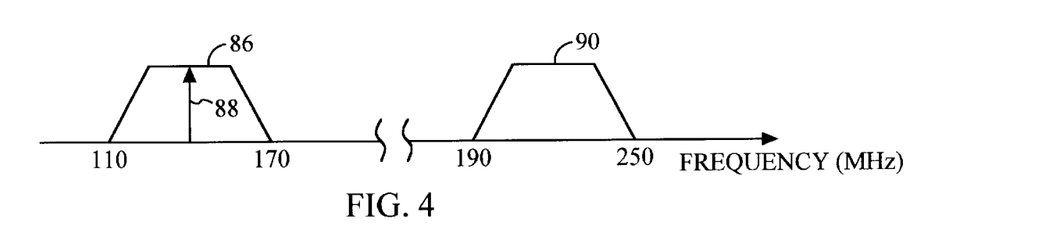
FIG. 4 is a schematic graph showing frequencies of signals generated in the network of FIG. 1, according to a preferred embodiment of the present invention.

FIG. 4 is a schematic graph showing frequencies of signals generated in network 10, according to a preferred embodiment of the present invention. Most preferably, LO 42 and LO 110 are adjusted so that forward IF frequencies are in a band 86 from approximately 110 MHz–170 MHz, and reverse IF frequencies are in a band 90 from approximately 190 MHz–250 MHz, corresponding to bandwidths of forward and reverse PCS transmissions. Alternatively, transmissions are in narrower sub-bands generally within band 86 and band 90. It will be appreciated that when system 10 is implemented to operate for one or more other transmission schemes, the bandwidths of the IF frequencies and the separation of the frequencies may be adjusted accordingly. Most preferably, pilot oscillator 38 of master unit 14 is set to have a center frequency 88 lying within forward IF frequencies band 86.

Figure 5:
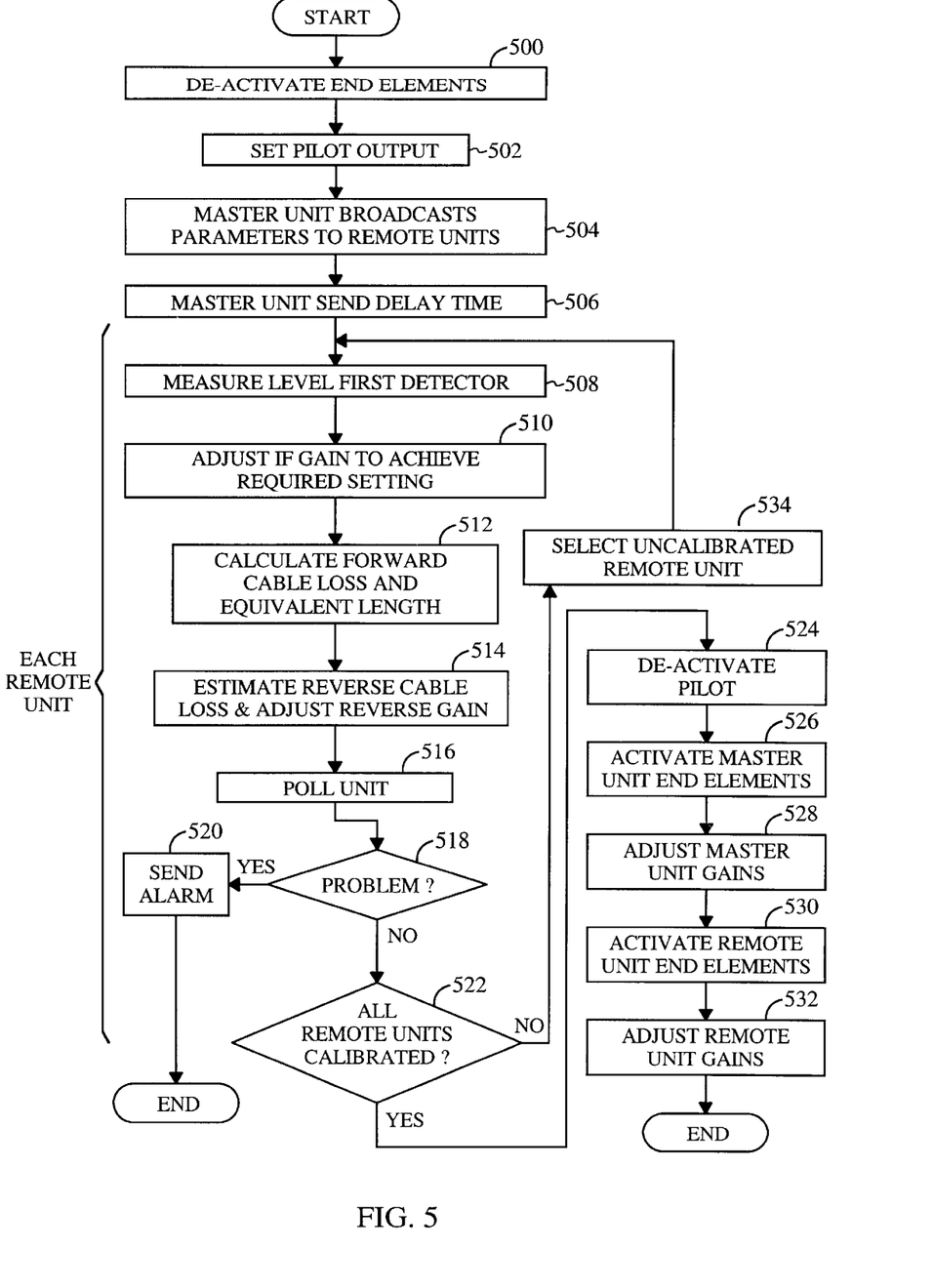
FIG. 5 is a flowchart showing steps comprised in an installation phase and an operation phase of the network of FIG. 1, according to a preferred embodiment of the present invention.

FIG. 5 is a flowchart showing steps comprised in an installation phase and an operation phase of network 10, according to a preferred embodiment of the present invention. The process described herein most preferably takes place after master unit 14 and remote units 16 have been positioned in building 18 and coupled together by cables 17. The process is most preferably implemented in an automatic or semi-automatic manner, via control signals issued from master unit 14, from where results of measurements on elements within system 10 are made available to console 19. The process is preferably initiated via console 19.

In an initial step 500 of an installation phase, active "end" elements comprised in the forward transmission path of the network 10 are de-activated so as to effectively isolate internal elements of the forward transmission path from surroundings external to the path. Active end elements within master unit 14 comprise elements before point 37 in forward unit 20, wherein the pilot signal from pilot oscillator 38 is injected into the system. Thus end elements in unit 20 comprise amplifier 28 and IF amplifier 36. The de-activation is preferably implemented by reducing gains of the amplifiers to as low values as possible, via respective attenuation signals RF-ATT1 and IF-ATT1, and/or by de-activating switches 27 and 39 to the amplifiers. For all remote units 16, end element amplifier 114 is de-activated via switch 131. Once the end elements have been de-activated, the remaining internal elements of the forward transmission path are substantially isolated from external surroundings, so that external signals are not received by the internal elements, and signals generated by the internal elements do not enter the surroundings.

Pilot oscillator 38 is activated, and an output level of the oscillator, as measured by detector 40, is preferably set at a level of 0 dBm at 502. Alternatively, the output level is set at any other convenient value, such as a nominal designed site output power level, and measured by detector 40. Master unit 14 broadcasts a signal indicating to each remote unit that an initialization process is starting at 504. Most preferably, unit 14 also informs each remote unit 16 of an expected nominal output power level, dependent on site characteristics, that the remote unit is to be adjusted to generate in the initialization process. Alternatively, in the process at least some remote units 16 are adjusted to generate a pre-determined default power output level. Master unit 14 informs remote units 16 of a time delay interval during which measurements on a specific unit are to be made at 506.

For each remote unit 16, RF detector 112 measures an RF level output by amplifier 108 at 508. Each respective remote unit 16 then adjusts the gain of its input IF amplifier 102 at 510, via IF attenuation signal IF-ATT2. Alternatively or additionally, a gain of amplifier 108 is adjusted. The gain is adjusted so that the RF level measured by detector 112 is a pre-determined value, preferably corresponding to the expected nominal input value received, as described above, from master unit 14. Alternatively, the gain is adjusted to the default value, or to any other suitable value. Most preferably, the gain is adjusted in increments, using one or more gain adjustment look-up tables stored memory 35. Alternatively, the gain is adjusted using one or more other methods known in the art.

Utilizing the pilot oscillator level, the measured detector 112 level, and known gains and losses of intermediate elements in the forward transmission path, such as the gain of amplifier 102 and losses due to splitter/combiners 21, a forward cable loss between master unit 14 and the specific remote unit is estimated at 512. Most preferably, the estimation is performed using one or more estimation look-up tables stored in memory 35. Alternatively, the estimation is by any other method known in the art. An equivalent cable length is calculated from the cable loss at 512, according to known properties of cables 17, by methods known in the art. A reverse cable loss is estimated from the properties of the cable at 514, the determined equivalent cable length, and any differences in the reverse IF path compared to the forward path, such as a difference loss due to splitter/combiners 21. It will be appreciated that the forward and reverse cable losses are dependent, inter alia, on the frequencies of the forward and reverse IF transmissions, described above with reference to FIG. 4.

From the determined reverse cable loss, a gain of IF amplifier 129 and/or amplifier 120, is set to compensate for the loss, preferably at approximately 5 dB above the loss at 514. Alternatively, the gains of amplifier 129 and amplifier 120 are set at another convenient value so as to compensate for reverse loss in cables 17.

The process of calibration described above is applied in turn, via commands from master unit 14, to each remote unit 16. As each remote unit calibration is terminated, preferably the specific remote unit is checked by being polled at 516. While measurements are made on a specific remote unit, if a problem in the measurement process is detected at 518, or during polling at 516, such as may be caused by a fault in a cable connecting to the remote unit, an alarm is sent at 520, most preferably to an operator of console 19.

If all the remote units are not calibrated, an uncalibrated remote unit is selected at 534. When all remote units have been calibrated at 522, master unit 14 de-activates pilot oscillator 38 at 524. The master unit end elements are activated at 526. Gains of the amplifiers 28 and 36 are adjusted according to design data for a specific site wherein remote units 16 are located at 528, and according to a link budget of network 10. Thus, an overall gain for the forward transmission path is set.

Once the forward transmission path gain is set, the remote unit end elements are activated at 530, and gains in the reverse path of elements which have not already been set are adjusted at 532. The gains are most preferably set so that a reverse transmission path gain is substantially equal to the forward transmission path gain. The reverse path gain is adjusted by setting gains of amplifiers 52A and 66A in main reverse unit 22 and amplifiers 52B and 66B in diversity unit 24.

In a final step, power amplifier 114 in each remote unit 16 is activated using the respective switch 131, and network 10 begins to receive and transmit to mobile transceivers in its vicinity, such as mobile 15, in an operational phase. During the operational phase, a power output level from each amplifier 114 is read by the respective RF detector 116, and detector 112 is also read. The difference in values may be transmitted to master unit 14 for use as a monitoring aid. In the case of a failure and/or a significant change of gain of amplifier 114 as shown by an unexpected difference, master unit 14 receives the indication and sends an alarm to console 19.

It will be appreciated that during operation of network 10 the steps described above with reference to installation of remote units 16 may be implemented as required for a specific remote unit 16. The steps may be implemented, for example, for changing and/or diagnosing parameters of a specific remote unit. For example, if detector 116 detects a lower RF level than expected, values of parameters in the forward path of the specific remote unit, including cable loss, may be re-evaluated.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for adjusting a radio-frequency (RF) power level in a cellular communications network, the network including a first plurality of signal-transmission-elements adapted to receive communication signals as a first variable-gain repeater coupled to a second plurality of signal-transmission-elements adapted to transmit the communication signals as a second variable-gain repeater, the method comprising:

de-activating at least some of the first plurality of signal-transmission-elements so that the communication signals are not received in the first plurality;

de-activating at least some of the second plurality of signal-transmission-elements so that the communication signals are not transmitted from the second plurality;

injecting a reference signal having a predetermined injected power level at the first plurality of signal-transmission-elements;

receiving the reference signal at the second plurality of signal-transmission-elements; measuring a received power level of the reference signal at the second plurality of signal-transmission-elements;

comparing the injected and received power levels;

responsive to the comparison, setting a gain of at least one of the signal-transmission-elements comprised in the first and second pluralities;

activating the at least some of the first plurality of signal-transmission-elements;

receiving at the first plurality of signal-transmission-elements the communication signals from a first region;

activating the at least some of the second plurality of signal-transmission-elements; and transmitting the communication signals to a second region from the second plurality of signal-transmission-elements;

wherein injecting the reference signal comprises measuring the predetermined injected power level with a first detector, wherein measuring the received power level comprises measuring the received power level with a second detector, and wherein activating the at least some of the second plurality of signal-transmission-elements comprises activating a power amplifier and setting a power level output of the power amplifier responsive to a power-amplifier output measured by a third detector and the predetermined injected power level measured by the first detector and the received power level measured by the second detector.

2. A method according to claim 1, wherein the first region and the second region do not overlap.

3. A method according to claim 1, and comprising setting an alarm responsive to the power-amplifier level and the received power level.

4. A method for adjusting a radio-frequency (RF) power level in a cellular communications network, the network including a first plurality of signal-transmission-elements adapted to receive communication signals as a first variable-gain repeater coupled to a second plurality of signal-transmission-elements adapted to transmit the communication signals as a second variable-gain repeater, the method comprising:

de-activating at least some of the first plurality of signal-transmission-elements so that the communication signals are not received in the first plurality;

de-activating at least some of the second plurality of signal-transmission-elements so that the communication signals are not transmitted from the second plurality;

injecting a reference signal having a predetermined injected power level at the first plurality of signal-transmission-elements;

receiving the reference signal at the second plurality of signal-transmission-elements; measuring a received power level of the reference signal at the second plurality of signal-transmission-elements;

comparing the injected and received power levels;

responsive to the comparison, setting a gain of at least one of the signal-transmission-elements comprised in the first and second pluralities;

receiving the communication signals at a frequency outside a predetermined forward-intermediate-frequency (FWD-IF) band at the first plurality of signal-transmission-elements;

mixing the communication signals with a local oscillator (LO) signal so as to generate a forward IF signal within the FWD-IF band;

conveying the forward IF signal to the second plurality of signal-transmission-elements; and mixing the forward IF signal with the LO signal so as to recover information in the communication signals at the second plurality of signal-transmission-elements;

wherein injecting the reference signal comprises generating the reference signal at a reference frequency within the FWD-F band;

receiving the communication signals at a frequency outside a predetermined reverse-intermediate-frequency (REV-IF) band, different from the FWD-IF band, at the second plurality of signal-transmission-elements;

mixing the communication signals with the LO signal so as to generate a reverse IF signal within the REV-IF band;

conveying the reverse IF signal to the first plurality of signal-transmission-elements; and mixing the reverse IF signal with the LO signal so as to recover information in the communication signals at the first plurality of signal-transmission-elements;

wherein setting the gain of the one of the first plurality of signal-transmission-elements and the gain of the one of the second plurality of signal-transmission-elements comprises:

determining gain values at the reference frequency; and extrapolating the gain values to the REV-IF band responsive to parameters of the first and second pluralities of signal-transmission-elements and of a cable coupling the pluralities.

5. A method for adjusting a radio-frequency (RF) power level in a cellular communications network, the network including a first plurality of signal-transmission-elements adapted to receive communication signals as a first variable-gain repeater coupled to a second plurality of signal-transmission-elements adapted to transmit the communication signals as a second variable-gain repeater, the method comprising:

de-activating at least some of the first plurality of signal-transmission-elements so that the communication signals are not received in the first plurality;

de-activating at least some of the second plurality of signal-transmission-elements so that the communication signals are not transmitted from the second plurality;

injecting a reference signal having a predetermined injected power level at the first plurality of signal-transmission-elements;

receiving the reference signal at the second plurality of signal-transmission-elements; measuring a received power level of the reference signal at the second plurality of signal-transmission-elements;

comparing the injected and received power levels;

responsive to the comparison, setting a gain of at least one of the signal-transmission-elements comprised in the first and second pluralities;

wherein the first plurality of signal-transmission-elements and the second plurality of signal-transmission-elements are coupled by a cable, and comprising determining an effective length and an effective loss of the cable responsive to the comparison.

6. A method according to claim 5, wherein the effective loss of the cable comprises a forward effective loss responsive to a forward-intermediate-frequency and a reverse effective loss responsive to a reverse-intermediate-frequency different from the forward-intermediate-frequency.

7. A method for adjusting a radio-frequency (RF) power level in a cellular communications network, the network including a first plurality of signal-transmission-elements adapted to receive communication signals as a first variable-gain repeater coupled to a second plurality of signal-transmission-elements adapted to transmit the communication signals as a second variable-gain repeater, the method comprising:

de-activating at least some of the first plurality of signal-transmission-elements so that the communication signals are not received in the first plurality;

de-activating at least some of the second plurality of signal-transmission-elements so that the communication signals are not transmitted from the second plurality;

injecting a reference signal having a predetermined injected power level at the first plurality of signal-transmission-elements;

receiving the reference signal at the second plurality of signal-transmission-elements; measuring a received power level of the reference signal at the second plurality of signal-transmission-elements;

comparing the injected and received power levels;

responsive to the comparison, setting a gain of at least one of the signal-transmission-elements comprised in the first and second pluralities;

broadcasting an expected-output-level value from the first plurality of signal-transmission-elements;

receiving the expected-output-level value at the second plurality of signal-transmission-elements; and setting the gain of the at least one of the signal-transmission-elements comprised in the second plurality responsive to the expected-output-level value.

8. A method according to claim 7, wherein setting the gain comprises setting a forward-gain for the communication signals in a forward path comprised in the first and second pluralities, and setting a reverse-gain for the communication signals in a reverse path comprised in the first and second pluralities.

9. A method according to claim 8, wherein the forward-gain and the reverse-gain differ by a pre-determined value.

10. A method according to claim 7, wherein the first plurality of signal-transmission-elements receive the communication signals at a signal-reception-level, and wherein injecting the reference signal comprises injecting the reference signal at an injection-level substantially the same as the signal-reception-level.

11. Apparatus for adjusting a radio-frequency (RF) power level in a cellular communications network, comprising:

a first plurality of signal-transmission-elements coupled as a first variable-gain repeater;

a second plurality of signal-transmission-elements coupled as a second variable-gain repeater;

a coupling connecting the first and second pluralities of signal-transmission-elements, which is adapted to convey communication signals therebetween;

a reference oscillator, which is adapted to inject a reference signal having a predetermined injected power level at the first plurality of signal-transmission-elements;

a receiver, which is adapted to measure a received power level of the reference signal at the second plurality of signal-transmission-elements;

switching circuitry, which is adapted to de-activate at least some of the first and second pluralities of signal-transmission-elements so that the reference signal is not radiated from the coupling and the first and second pluralities of signal-transmission-elements; and control circuitry which is adapted, responsive to the injected power level and the received power level, to set a gain of one of the signal-transmission-elements comprised in the first and second pluralities.

12. Apparatus according to claim 11, wherein the switching circuitry is adapted to activate the at least some of the first plurality of signal-transmission-elements and the at least some of the second plurality of signal-transmission-elements so that the first plurality of signal-transmission-elements receives the communication signals from a first region and the second plurality of signal-transmission-elements transmits the communication signals to a second region.

13. Apparatus according to claim 12, wherein the first region and the second region do not overlap.

14. Apparatus according to claim 12, wherein the second plurality of signal-transmission-elements comprises a power amplifier, and comprising:

a first detector which is adapted to measure the predetermined injected power level;

a second detector which is adapted to measure the received power level; and a third detector which is adapted to measure a power-amplifier-level output of the power amplifier, so that a power-amplifier level is set responsive to the power-amplifier-level output and the predetermined injected power level and the received power level.

15. Apparatus according to claim 14, and comprising an alarm which is activated responsive to the power-amplifier level and the received power level.

16. Apparatus according to claim 12, wherein:

the first plurality of signal-transmission-elements are adapted to receive the communication signals at a frequency outside a predetermined forward-intermediate-frequency (FWD-IF) band and to mix the communication signals with a local oscillator (LO) signal so as to generate a forward IF signal within the FWD-IF band; and the second plurality of signal-transmission-elements are adapted to receive the forward IF signal and to mix the forward IF signal with the LO signal so as to recover information in the communication signals.

17. Apparatus according to claim 16, wherein the reference oscillator is adapted to generate the reference signal at a reference frequency within the FWD-IF band.

18. Apparatus according to claim 17, wherein:

the second plurality of signal-transmission-elements is adapted to receive the communication signals at a frequency outside a predetermined reverse-intermediate-frequency (REV-IF) band, different from the FWD-IF band, and to mix the communication signals with the LO signal so as to generate a reverse IF signal within the REV-If band;

the first plurality of signal-transmission-elements is adapted to mix the reverse IF signal with the LO signal so as to recover information in the communication signals; and the control circuitry is adapted to determine gain values at the reference frequency and to extrapolate the gain values to the REV-IF band responsive to parameters of the first and second pluralities of signal-transmission-elements and of a cable coupling the pluralities.

19. Apparatus according to claim 11, wherein the coupling comprises a cable, and wherein the control circuitry is adapted to determine an effective length and an effective loss of the cable responsive to the injected power level and the received power level.

20. Apparatus according to claim 19, wherein the effective loss of the cable comprises a forward effective loss responsive to a forward-intermediate-frequency and a reverse effective loss responsive to a reverse-intermediate-frequency different from the forward-intermediate-frequency.

21. Apparatus according to claim 11, wherein:

the first plurality of signal-transmission-elements are adapted to broadcast an expected-output-level value therefrom; the second plurality of signal-transmission-elements are adapted to receive the expected-output-level value; and the control circuitry is adapted to set the gain of the at least one of the signal-transmission-elements comprised in the second plurality responsive to the expected-output-level value.

22. Apparatus according to claim 11, wherein the first and second pluralities comprise:

forward-path-elements for the communication signals following a forward path from the first to the second plurality; and reverse-path-elements for the communication signals following a reverse pat from the second to the first plurality;

and wherein the control circuitry is adapted to set a forward-gain for the forward-path-elements and a reverse-gain for the reverse-path-elements.

23. Apparatus according to claim 22, wherein the forward-gain and the reverse-gain differ by a predetermined value.

24. Apparatus according to claim 11, wherein the first plurality of signal-transmission-elements receive the communication signals at a signal-reception-level, and wherein the reference oscillator is adapted to inject the reference signal at an injection-level substantially the same as the signal-reception-level.

* * * * *